July 26, 1927.

H. H. BRIDGE

PRIMING DEVICE

Filed April 4, 1923

1,636,897

INVENTOR.

HERBERT H. BRIDGE.

BY

ATTORNEY.

Patented July 26, 1927.

1,636,897

UNITED STATES PATENT OFFICE.

HERBERT H. BRIDGE, OF DETROIT, MICHIGAN.

PRIMING DEVICE.

Application filed April 4, 1923. Serial No. 629,938.

My invention relates to priming devices and more particularly to devices adapted to be screwed into the cylinder head of an automobile, whereby gasoline may be fed therethrough directly into the cylinders in order to make possible the starting of the motor under adverse conditions.

It is a primary object of my invention to provide a priming device of the above described nature of cheap and economical construction and one which will function efficiently at all times.

With these and other objects in view, my invention consists in the arrangement, combination and construction of the various parts of my improved device as described in the specification, claimed in my claims and shown in the accompanying drawings in which:

Figure 1:
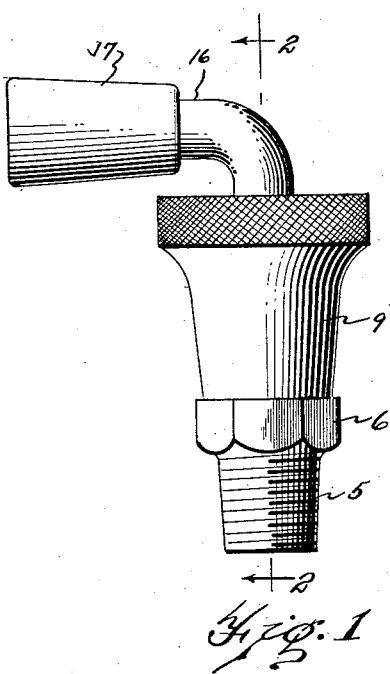
Fig. 1 is a side elevation of my improved device.
Figure 2:
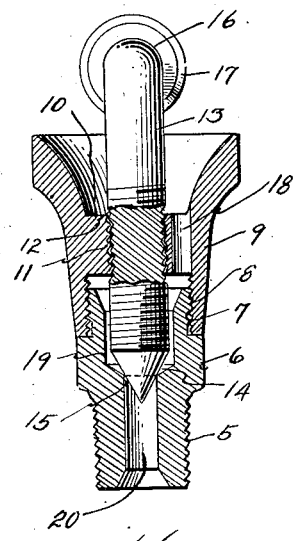
Fig. 2 is a sectional view taken on line 2—2 of Fig. 1.
Figure 3:
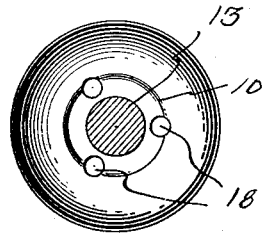
Fig. 3 is a top or plan view with the upper portion of the needle valve stem cut away.

My device consists of a body portion having a screw threaded end 5 on the bottom thereof adapted to be screwed into a cylinder head having a suitable screw threaded opening therein. A hexagon portion 6 is provided intermediate the ends of the body member whereby the said body member may be tightly screwed into the cylinder head.

Screw threads 7 are provided on the upper end of the body member adapted to cooperate with screw threads 8 provided on the inner side of a cup member 9 whereby the said cup member 9 may be screwed upon the body member.

The cup 9 is provided with a web 10 extending thereacross and having a screw threaded aperture 11 at approximately its center into which the screw threaded portion 12 of the needle valve stem 13 is adapted to be assembled.

The stem 13 is provided at its lower end with a tapered portion 14 adapted to seat in the opening 15 provided in the body member. The stem 13 is bent at its upper end so as to provide a horizontal extension 16 on the end of which is an enlarged handle member 17.

The web 10 is provided with a plurality of openings 18 therein so that when gasoline or other fuel is placed in the top of the cup member 9, it will flow therethrough into the chamber 19 provided in the body member and when the stem 13 is rotated so as to raise the tapered portion 14 thereon off the seat 15, fuel will be permitted to pass through the opening 20 into the cylinder of the automobile.

It will be noted that the screw threads 11 are slightly smaller than the threads 12 so that a limited lateral movement of the stem 13 may be had, thus assisting in centering the tapered portion 14 in the opening 15 when moving the stem from an elevated position to a lowered position with the tapered portion 14 seating in the opening 15.

It will be further noted that in constructing the body member and the cup member of separate elements with a hexagon portion on the body member, a considerable having in metal and cost is effected. The employment of an integral web in the cup member having fuel openings and a stem opening therein also makes for inexpensive, simple and cheap construction.

In order to prevent removal of the stem from the cup member, I have found it practicable to burr one or two threads near the lower end of the stem 13 after it has been assembled in the cup member.

It is obvious that various changes may be made in the construction and operating mechanisms of my improved device without departing from the spirit of my invention and it is my intention to cover by my claims such changes as may be reasonably included within the scope thereof.

What I claim is:

1. A priming device of the class described comprising a body portion adapted for assembly to a cylinder head, an angular faced shoulder intermediate the ends of said body member, a screw threaded portion on the upper end of said body member, a second member having an open ended cup at its outer extremity and adapted on its lower end to be screwed to said body member, a web extended across the area of said second member intermediate its ends below the cup and having a screw threaded opening therein, a stem member adapted to extend through said opening and having screw threads thereon cooperating with the screw threads in said opening, to make said stem vertically adjustable, and means on the lower end of said stem for closing the bottom of said body portion.

2. A priming device of the class described comprising a body portion adapted for assembly to a cylinder head, an angular faced shoulder intermediate the ends of said body member, a screw threaded portion on the upper end of said body member, a second member having an open ended cup at its outer extremity and adapted on its lower end to be screwed to said body member, a web extended across the area of said second member intermediate its ends below the cup and having a screw threaded opening therein, a stem member adapted to extend through said opening and having screw threads thereon cooperating with the screw threads in said opening in a manner to permit of limited lateral movement of said stem and to make said stem vertically adjustable, and means on the lower end of said stem for closing the bottom of said body portion.

HERBERT H. BRIDGE.